(12) United States Patent
Sakurada

(10) Patent No.: US 11,767,417 B2
(45) Date of Patent: *Sep. 26, 2023

(54) TIRE COMPRISING A TREAD

(71) Applicant: COMPAGNIE GENERALE DES ETABLISSEMENTS MICHELIN, Clermont-Ferrand (FR)

(72) Inventor: Tomoya Sakurada, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 193 days.

This patent is subject to a terminal disclaimer.

(21) Appl. No.: 17/044,159

(22) PCT Filed: Mar. 30, 2018

(86) PCT No.: PCT/JP2018/013614
§ 371 (c)(1),
(2) Date: Sep. 30, 2020

(87) PCT Pub. No.: WO2019/187005
PCT Pub. Date: Oct. 3, 2019

(65) Prior Publication Data
US 2021/0115229 A1 Apr. 22, 2021

(51) Int. Cl.
| | | |
|---|---|---|
| C08L 9/06 | (2006.01) | |
| B60C 1/00 | (2006.01) | |
| B60C 11/00 | (2006.01) | |
| C08K 3/04 | (2006.01) | |
| C08K 3/06 | (2006.01) | |
| C08K 3/36 | (2006.01) | |
| C08L 7/00 | (2006.01) | |

(52) U.S. Cl.
CPC ............. C08L 9/06 (2013.01); B60C 1/0016 (2013.01); B60C 11/005 (2013.01); C08K 3/04 (2013.01); C08K 3/06 (2013.01); C08K 3/36 (2013.01); C08L 7/00 (2013.01)

(58) Field of Classification Search
CPC . C08L 9/06; C08L 7/00; B60C 1/0016; B60C 11/005; C08K 3/04; C08K 3/06; C08K 3/36
USPC .......................................... 524/145
See application file for complete search history.

(56) References Cited

U.S. PATENT DOCUMENTS

| | | | |
|---|---|---|---|
| 6,028,137 A | 2/2000 | Mahmud et al. | |
| 6,414,061 B1 | 7/2002 | Cruse et al. | |
| 6,774,255 B1 | 8/2004 | Tarvidat et al. | |
| 6,849,754 B2 | 2/2005 | Deschler et al. | |
| 7,217,751 B2 | 5/2007 | Durel et al. | |
| 9,701,161 B2 | 7/2017 | Bondu et al. | |
| 2004/0050469 A1 | 3/2004 | Sandstrom | |
| 2004/0051210 A1 | 3/2004 | Fardivat et al. | |
| 2004/0129360 A1 | 7/2004 | Vidal | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2005/0109436 A1 | 5/2005 | Bruant et al. | |
| 2005/0245753 A1 | 11/2005 | Cruse et al. | |
| 2007/0228322 A1 | 10/2007 | Chaves et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2010/0145089 A1 | 6/2010 | Mignani et al. | |
| 2011/0294953 A1 | 12/2011 | Seeboth et al. | |
| 2012/0283360 A1 | 11/2012 | Veyland et al. | |
| 2013/0267640 A1* | 10/2013 | Lopez .................. | C08K 5/0016 524/506 |
| 2015/0107735 A1 | 4/2015 | Djelloul-Mazouz et al. | |
| 2015/0136287 A1 | 5/2015 | Bondu, Jr. et al. | |
| 2015/0151580 A1 | 6/2015 | Boudu, Jr. et al. | |
| 2015/0314651 A1 | 11/2015 | Gayton et al. | |
| 2019/0255887 A1 | 8/2019 | Perrin et al. | |
| 2020/0101795 A1 | 4/2020 | Sakurada et al. | |
| 2021/0053397 A1 | 2/2021 | Sakurada | |
| 2021/0363332 A1 | 11/2021 | Sakurada | |

FOREIGN PATENT DOCUMENTS

| | | |
|---|---|---|
| DE | 19731525 A1 | 7/1998 |
| EP | 2889157 A2 | 7/2015 |
| JP | 2-189203 A | 7/1990 |
| JP | 11-60810 A | 3/1999 |
| JP | 2000-62414 A | 2/2000 |
| JP | 2002-19416 A | 1/2002 |
| JP | 2005-35404 A | 2/2005 |
| JP | 2005-67236 A | 3/2005 |

(Continued)

OTHER PUBLICATIONS

S. Brunauer, et al., "Adsorption of Gases in Multimolecular Layers", J. Am. Chem. Soc., vol. 60, pp. 309-319 (1938).

(Continued)

Primary Examiner — Ling Siu Choi
Assistant Examiner — Ronald Grinsted
(74) Attorney, Agent, or Firm — VENABLE LLP

(57) ABSTRACT

A tire having a tread comprising at least three radially superposed portions which comprise a radially external portion being made of a first rubber composition, a radially intermediate portion being made of a second rubber composition and a radially internal portion being made of a third rubber composition; wherein each of the rubber compositions is based on at least an elastomer matrix, a reinforcing filler and a crosslinking system based on sulphur; wherein the amount in phr of sulphur in the first rubber composition is lower than that in the second rubber composition, and wherein the amount in phr of sulphur in the second rubber composition is higher than that in the third rubber composition.

20 Claims, No Drawings

(56) References Cited

FOREIGN PATENT DOCUMENTS

| | | | | |
|---|---|---|---|---|
| JP | 2005067236 A | * | 3/2005 | ........... B60C 11/005 |
| JP | 2007-131084 A | | 5/2007 | |
| JP | 2015-522472 A | | 8/2015 | |
| WO | 96/37547 A2 | | 11/1996 | |
| WO | 97/36724 A2 | | 10/1997 | |
| WO | 99/09036 A1 | | 2/1999 | |
| WO | 99/16600 A1 | | 4/1999 | |
| WO | 99/28380 A1 | | 6/1999 | |
| WO | 02/30939 A1 | | 4/2002 | |
| WO | 02/31041 A1 | | 4/2002 | |
| WO | 02/083782 A1 | | 10/2002 | |
| WO | 03/002648 A1 | | 1/2003 | |
| WO | 03/002649 A1 | | 1/2003 | |
| WO | 03/016387 A1 | | 2/2003 | |
| WO | 2004/033548 A1 | | 4/2004 | |
| WO | 2006/023815 A2 | | 3/2006 | |
| WO | 2006/125532 A1 | | 11/2006 | |
| WO | 2006/125533 A1 | | 11/2006 | |
| WO | 2006/125534 A1 | | 11/2006 | |
| WO | 2007/098080 A2 | | 8/2007 | |
| WO | 2008/055986 A2 | | 5/2008 | |
| WO | 2008/060273 A1 | | 5/2008 | |
| WO | 2010/072685 A1 | | 7/2010 | |
| WO | 2012/069565 A1 | | 5/2012 | |
| WO | 2018/002488 A1 | | 1/2018 | |

OTHER PUBLICATIONS

International Search Report dated Jun. 19, 2018, in corresponding PCT/JP2018/013614 (2 pages).

\* cited by examiner

TIRE COMPRISING A TREAD

TECHNICAL FIELD

The field of the invention is that of rubber compositions for tire treads, more precisely rubber compositions for tire treads suitable for snow tires or winter tires capable of rolling over ground surfaces covered with snow.

BACKGROUND ART

As is known, the snow tires classified in a category of use "snow", identified by an inscription the alpine symbol ("3-peak-mountain with snowflake"), marked on their sidewalls, mean tires whose tread patterns, tread compounds and/or structures are primarily designed to achieve, in snow conditions, a performance better than that of normal tires intended for normal on-road use with regard to their abilities to initiate, maintain or stop vehicle motion.

CITATION LIST

Patent Literature

PTL 1: WO 2012/069565

The patent literature 1 discloses a tire tread that comprises a rubber composition based on a functional diene elastomer, a reinforcing inorganic filler and a plasticizing agent, said tire having an improved grip on snowy ground.

Snowy ground has a feature of having a low friction coefficient and a constant objective of tire manufacturers is improvement of a grip performance of tires on snow-covered (snowy) ground during the service life of the tire.

SUMMARY OF INVENTION

Technical Problem

During their research, the inventors have discovered that a specific tire tread composite structure allows unexpectedly improved the grip performance of the tire on snowy ground in the worn state while improving or maintaining the grip performance in the new state.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of more than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

As a tire has a geometry of revolution about an axis of rotation, the geometry of the tire is generally described in a meridian plane containing the axis of rotation of the tire, and the following definitions of directions of the tire are understood in the present application:

A radial direction is a direction perpendicular to the axis of rotation of the tire;

An axial direction is a direction parallel to the axis of rotation of the tire;

A circumferential direction is a direction perpendicular to the meridian plane.

A plane being perpendicular to the axis of rotation of the tire and passing through the middle of a tread surface of the tire is referred to as an equatorial plane of the tire.

In what follows, expressions "radially", "axially" and "circumferentially" respectively mean "in the radial direction", "in the axial direction" and "in the circumferential direction". Expressions "radially on the inside (radially inner or radially internal), or respectively radially on the outside (radially outer or radially external)" mean "closer or, respectively, further away, from the axis of rotation of the tire, in the radial direction, than". Expressions "axially on the inside (axially inner or axially interior) or respectively axially on the outside (axially outer or axially exterior)" mean "closer or, respectively further away, from the equatorial plane, in the axial direction, than". Respective dimensions of a given element in the radial, axial and circumferential directions will also be denoted "radial thickness or height", "axial width" and "circumferential length" of this element. Expression "laterally" means "in the circumferential or axial direction".

Solution to Problem

A first aspect of the invention is a tire having a tread comprising at least three radially superposed portions which comprise a radially external portion being made of a first rubber composition (FC), a radially intermediate portion being made of a second rubber composition (SC) and a radially internal portion being made of a third rubber composition (TC); wherein each of the rubber compositions (FC, SC and TC) is based on at least an elastomer matrix, a reinforcing filler, and a crosslinking system based on a sulphur; wherein the amount in phr of sulphur in the first rubber composition (FC) is lower than that in the second rubber composition (SC), and wherein the amount in phr of sulphur in the second rubber composition (SC) is higher than that in the third rubber composition (TC).

The radially intermediate portion is positioned between the radially external portion and the radially internal portion.

The amount in phr of sulphur is to say the amount of vulcanization sulphur content in phr. The vulcanization sulphur may be sulphur, sulphur derived from a sulphur-donating agent or the mixtures thereof.

A second aspect of the invention is the tire according to the first aspect, wherein the second rubber composition (SC) is such that the amount of sulphur is more than 2 phr (for example, between 2 and 10 phr), preferably more than 2.5 phr (for example, between 2.5 and 5 phr).

According to a preferred embodiment of the second aspect, the amount of sulphur in the first rubber composition (FC) is at most 2 phr (for example, 0.5 to 2 phr), and the amount of sulphur in the third rubber composition (TC) is at most 2 phr (for example, 0.5 to 2 phr).

A third aspect of the invention is the tire according to the first aspect or the second aspect, wherein each of the rubber compositions (FC, SC and TC) is such that the crosslinking system is further based on a vulcanization accelerator.

The vulcanization accelerator can promote the sulphur vulcanization reaction in the rubber compositions.

A fourth aspect of the invention is the tire according to the third aspect, wherein the amount in phr of the vulcanization accelerator in the first rubber composition (FC) is lower than that in the second rubber composition (SC), and wherein the amount in phr of the vulcanization accelerator in the second rubber composition (SC) is higher than that in the third rubber composition (TC).

A fifth aspect of the invention is the tire according to the fourth aspect, wherein the second rubber composition (SC) is such that the amount of the vulcanization accelerator is more than 2 phr (for example, between 2 and 10 phr), preferably more than 3 phr (for example, between 3 and 5 phr).

According to a preferred embodiment of the fifth aspect, the amount of the vulcanization accelerator in the first rubber composition (FC) is at most 2 phr (for example, 0.5 to 2 phr), and the amount of the vulcanization accelerator in the third rubber composition (TC) is at most 2 phr (for example, 0.5 to 2 phr).

A sixth aspect of the invention is the tire according to any one of the third to the fifth aspects, wherein the total amount in phr of sulphur and the vulcanization accelerator in the first rubber composition (FC) is lower than that in the second rubber composition (SC), and wherein the total amount in phr of sulphur and the vulcanization accelerator in the second rubber composition (SC) is higher than that in the third rubber composition (TC).

A seventh aspect of the invention is the tire according to the sixth aspect, wherein the second rubber composition (SC) is such that the total amount of sulphur and the vulcanization accelerator is more than 4 phr (for example, between 4 and 20 phr), preferably more than 4.5 phr (for example, between 4.5 and 15 phr), more preferably more than 5 phr (for example between 5 and 10 phr).

According to a preferred embodiment of the seventh aspect, the total amount of sulphur and the vulcanization accelerator in the first rubber composition (FC) is at most 4 phr (for example, 1 to 4 phr), and the total amount of sulphur and the vulcanization accelerator in the third rubber composition (TC) is at most 4 phr (for example, 1 to 4 phr).

An eighth aspect of the invention is the tire according to any one of the third to the seventh aspects, wherein each of the rubber compositions (FC, SC and TC) is such that the vulcanization accelerator is selected from the group consisting of sulphenamide type vulcanization accelerators (for example, N-cyclohexyl-2-benzothiazole sulphenamide (abbreviated to "CBS"), N,N-dicyclohexyl-2 benzothiazolesulphenamide ("DCBS"), N-tert-butyl-2-benzothiazolesulphenamide ("TBBS"), N-tert-butyl-2 benzothiazolesulphenimide ("TBSI")), thiazole type vulcanization accelerators (for example, 2-mercaptobenzothiazyl disulphide (abbreviated to "MBTS")), thiuram type accelerators (for example, tetrabenzylthiuram disulfide ("TBZTD")), zinc dithiocarbamate type vulcanization accelerators (for example, zinc dibenzyldithiocarbamate ("ZBEC")) and the mixtures thereof.

A ninth aspect of the invention is the tire according to the eighth aspect, wherein each of the rubber compositions (FC, SC and TC) is such that the vulcanization accelerator predominantly comprises a sulphenamide type vulcanization accelerator, that is, the vulcanization accelerator comprises more than 50% by weight of the sulphenamide type vulcanization accelerator per 100% of the vulcanization accelerator, preferably the vulcanization accelerator comprises more than 60%, more preferably more than 70%, still more preferably more than 80%, particularly more than 90%, more particularly 100%, by weight of the sulphenamide type vulcanization accelerator per 100% of the vulcanization accelerator.

A tenth aspect of the invention is the tire according to any one of the first to the ninth aspects, wherein each of the rubber compositions (FC, SC and TC) is such that the elastomer matrix comprises, particularly consists of, at least a diene elastomer selected from the group consisting of polybutadienes (BR), natural rubber (NR), synthetic polyisoprenes (IR), butadiene copolymers, isoprene copolymers, and the mixtures thereof.

An eleventh aspect of the invention is the tire according to any one of the first to the tenth aspects, wherein the first rubber composition (FC) is such that the amount of the reinforcing filler is 60 to 200 phr, preferably 70 to 190 phr, more preferably 80 to 180 phr, still more preferably 90 to 170 phr, particularly 100 to 160 phr, wherein the second rubber composition (SC) is such that the amount of the reinforcing filler is 30 to 200 phr, preferably 40 to 190 phr, more preferably 50 to 180 phr, still more preferably 60 to 170 phr, particularly 70 to 160 phr, wherein the third rubber composition (TC) is such that the amount of the reinforcing filler is 20 to 200 phr, preferably 30 to 190 phr, more preferably 40 to 180 phr, still more preferably 50 to 170 phr, particularly 60 to 160 phr.

A twelfth aspect of the invention is the tire according to any one of the first to the eleventh aspects, wherein each of the rubber compositions (FC, SC and TC) is such that the reinforcing filler predominantly comprises a reinforcing inorganic filler, that is, the reinforcing filler comprises more than 50% by weight of the reinforcing inorganic filler per 100% of the reinforcing filler, preferably the reinforcing filler comprises more than 60%, more preferably more than 70%, still more preferably more than 80%, particularly more than 90%, by weight of the reinforcing inorganic filler per 100% of the reinforcing filler.

A thirteenth aspect of the invention is the tire according to the twelfth aspect, wherein each of the rubber compositions (FC, SC and TC) is such that the reinforcing inorganic filler predominantly comprises silica, that is, the reinforcing inorganic filler comprises more than 50% by weight of silica per 100% of the reinforcing inorganic filler, preferably the reinforcing inorganic filler comprises more than 60%, more preferably more than 70%, still more preferably more than 80%, particularly more than 90%, more particularly 100%, by weight of silica per 100% of the reinforcing inorganic filler.

A fourteenth aspect of the invention is the tire according to any one of the first to the thirteenth aspects, wherein each of the rubber compositions (FC, SC and TC) is such that the reinforcing filler comprises less than 75 phr (for example, between 0 and 75 phr), preferably less than 65 phr (for example, between 0 and 65 phr), more preferably less than 55 phr (for example between 0 and 55 phr), still more preferably less than 45 phr (for example, between 0 and 45 phr), particularly less than 35 phr (for example, between 0 and 35 phr), more particularly less than 25 phr (for example, between 0 and 25 phr), still more particularly less than 15 phr (for example, between 1 and 15 phr), advantageously less than 10 phr (for example, between 2 and 10 phr), of carbon black.

Within each of the aforementioned ranges of content of carbon black in the rubber compositions (FC, SC and TC), there is a benefit of coloring properties (black pigmentation agent) and anti-UV properties of carbon blacks, without furthermore adversely affecting the typical performance provided by the reinforcing inorganic filler, namely high grip on snowy ground and/or low hysteresis loss.

According to a preferred embodiment of the fourteenth aspect, in the second rubber composition (SC) and/or (advantageously and) the third rubber composition (TC), carbon black exhibits a BET surface area (in accordance with ASTM D6556-10) of less than 110 m$^2$/g (for example, between 0 and 110 m$^2$/g), preferably less than 100 m$^2$/g (for example, between 0 and 100 m$^2$/g), more preferably less than 90 m$^2$/g (for example, between 0 and 90 m$^2$/g), still more preferably less than 80 m$^2$/g (for example, between 0 and 80 m$^2$/g), particularly less than 70 m$^2$/g (for example, between 5 and 70 m$^2$/g), more particularly less than 60 m$^2$/g (for example, between 10 and 60 m$^2$/g), still more particularly less than 50 m$^2$/g (for example, between 15 and 50 m$^2$/g), especially at most 40 m$^2$/g (for example, 20 to 40 m$^2$/g).

According to a more preferred embodiment of the fourteenth aspect or the above preferred embodiment, in the second rubber composition (SC) and/or (advantageously and) the third rubber composition (TC), carbon black exhibits an oil absorption number of compressed Sample (COAN: compressed oil absorption number) (in accordance with ASTM D3493-16) of less than 90 ml/100 g (for example, between 45 and 90 ml/100 g), preferably less than 87 ml/100 g (for example, between 50 and 87 ml/100 g), more preferably at most 85 ml/100 g (for example, 55 to 85 ml/100 g).

A fifteenth aspect of the invention is the tire according to any one of the first to the fourteenth aspects, wherein the third rubber composition (TC) is further based on a plasticizing agent comprising a liquid plasticizer exhibiting a glass transition temperature (Tg$_{DSC}$) of less than −70° C. (for example, between −140° C. and −70° C.), preferably less than −80° C. (for example, between −130° C. and −80° C.), more preferably less than −90° C. (for example, between −120° C. and −90° C.), still more preferably less than −100° C. (for example, between −110° C. and −100° C.).

A sixteenth aspect of the invention is the tire according to the fifteenth aspect, wherein the third rubber composition (TC) is such that the amount of the liquid plasticizer exhibiting the glass transition temperature is 5 to 100 phr, preferably 10 to 90 phr, more preferably 10 to 80 phr, still more preferably 10 to 70 phr, particularly 10 to 60 phr, more particularly 10 to 50 phr, still more particularly 10 to 40 phr.

A seventeenth aspect of the invention is the tire according to the fifteenth aspect or the sixteenth aspect, wherein the third rubber composition (TC) is such that the liquid plasticizer exhibiting the glass transition temperature (Tg$_{DSC}$) is selected from the group consisting of liquid phosphate plasticizer(s) and the mixtures thereof.

An eighteenth aspect of the invention is the tire according to the seventeenth aspect, wherein the third rubber composition (TC) is such that the liquid phosphate plasticizer(s) has between 12 and 30 carbon atoms in total, preferably the liquid phosphate plasticizer(s) is trialkyl phosphate having between 12 and 30 carbon atoms in total.

The number of carbon atoms of trialkyl phosphate should be taken to mean the total number of carbon atoms of three alkyl groups. The three alkyl groups of trialkyl phosphate may be the same or different each other. The term "alkyl" used herein refers to a straight or branched alkyl group, which may contain a hetero atom such as an oxygen atom in its chain, or which may be substituted with a halogen atom such as fluorine, chlorine, bromine or iodine. The trialkyl phosphate may have one or two phenyl groups of instead of alkyl groups.

Mention may be made, as examples of the trialkyl phosphate, of an oil selected from the group consisting of tris(2-butoxyethyl) phosphate ($C_{18}H_{39}O_7P$), 2-ethylhexyl diphenyl phosphate ($C_{20}H_{27}O_4P$), trioctyl phosphate (especially, tris(2-ethylhexyl) phosphate) ($C_{24}H_{51}O_4P$) and the mixtures thereof.

A nineteenth aspect of the invention is the tire according to the eighteenth aspect, wherein the third rubber composition (TC) is such that the liquid phosphate plasticizer(s) is tris(2-ethylhexyl) phosphate.

The liquid phosphate plasticizer is commercially available; for example, product name: Disflmoll TOF (Tg$_{DSC}$=−105° C.) provided by Lanxess co., ltd.

A twentieth aspect of the invention is the tire according to any one of the first to the nineteenth aspects, wherein the radially external portion is adjacent to the radially intermediate portion, and wherein the radially intermediate portion is adjacent to the radially internal portion.

A twenty first of the invention is the tire according to any one of the first to the twentieth aspects, wherein the radially external portion, the radially intermediate portion and the radially internal portion are intended to come into contact with the ground during the service life of the tire.

The service life of the tire means the duration to use the tire (for example, the term from the new state to the final state of the tire, the final state means a state on reaching the wear indicator bar(s) in the tread of tire).

A twenty second aspect of the invention is the tire according to any one of the first to the twenty first aspects, wherein the tire is a snow tire.

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Advantageous Effects of Invention

The tread composite structure with each of the specific rubber compositions on the radially external portion, the radially intermediate and the radially internal portion allows unexpectedly improved the grip performance of the tire on snowy ground in the worn state while improving or maintaining the grip performance in the new state.

Each of the below aspect(s), the embodiment(s), the instantiation(s), and the variant(s) including each of the preferred range(s) and/or matter(s) may be applied to any one of the other aspect(s), the other embodiment(s), the other instantiation(s) and the other variant(s) of the invention unless expressly stated otherwise.

Each of the rubber compositions (FC, SC and TC) of the tread of the tire according to the invention is based on each elastomer matrix.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated".

Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the"vinyltoluene" commercial mixture, para-(tert-butyl) styrene, methoxy styrenes, chlorostyrenes, vinylmesitylene, divinylbenzene or vinylnaphthalene.

According to a preferred embodiment of the tenth aspect, in the first rubber composition (FC), the second rubber composition (SC) and/or the third rubber composition (TC), the copolymers are preferably selected from the group consisting of butadiene copolymers the mixtures thereof, more preferably selected from the group consisting of styrene-butadiene copolymers (SBR), butadiene-isoprene copolymers (BIR), styreneisoprene copolymers (SIR), styrene-butadiene-isoprene copolymers (SBIR) and the mixtures thereof, still more preferably selected from the group consisting of styrene-butadiene copolymers (SBR) and the mixtures thereof.

The diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution. This elastomer may be coupled and/or star-branched or else functionalized with a coupling and/or star-branching or functionalizing agent.

According to a more preferred embodiment of the preferred embodiment, in the first rubber composition (FC), the elastomer matrix comprises more than 50 phr and up to 100 phr, preferably 55 to 95 phr, more preferably 60 to 90 phr, still more preferably 65 to 85 phr, particularly 70 to 80 phr, of a first diene elastomer which is a styrene butadiene copolymer(s), preferably a solution styrene butadiene copolymer(s), and the elastomer matrix comprises no second diene elastomer or comprises less than 50 phr, preferably 5 to 45 phr, more preferably 10 to 40 phr, still more preferably 15 to 35 phr, particularly 20 to 30 phr, of a second diene elastomer which is different from the first diene elastomer.

According to a still more preferred embodiment of the above more preferred embodiment, in the first rubber composition (FC), the first diene elastomer exhibits a glass transition temperature ($Tg_{DSC}$) of less than −40° C. (for example, between −40° C. and −110° C.), preferably less than −45° C. (for example, between −45° C. and −105° C.), more preferably less than −50° C. (for example, between −50° C. and −100° C.), still more preferably less than −55° C. (for example, between −55° C. and −95° C.), particularly at most −60° C. (for example, −60° C. to −90° C.).

According to a particular embodiment of the above more preferred embodiment or the above still more preferred embodiment, in the first rubber composition (FC), the second diene elastomer is a polybutadiene(s) (BR) more preferably having a content (molar %) of 1,2-units of between 4% and 80% or those having a content (molar %) of cis-1,4-units of greater than 80%, more preferably greater than 90% (molar %), still more preferably greater than or equal to 96% (molar %).

According to a more particular embodiment of the above more preferred embodiment, the above still more preferred embodiment or the above particular embodiment, in the first rubber composition (FC), the styrene-butadiene copolymer exhibits a styrene unit of less than 30% by weight (for example, between 3 and 30% by weight) per 100% by weight of the styrene-butadiene copolymer, preferably less than 27% by weight (for example, between 5 and 27% by weight), more preferably less than 23% by weight (for example, between 7 and 23% by weight), still more preferably less than 20% by weight (for example, between 10 and 20% by weight), particularly at most 18% by weight (for example, from 12 to 18%). The styrene unit can be determined by 1H NMR method in accordance with ISO 21561.

According to a preferred embodiment of the tenth aspect, in the second rubber composition (SC) and/or (advantageously and) the third rubber composition (TC), the elastomer matrix comprises more than 50 phr and up to 100 phr, preferably 60 to 100 phr, more preferably 70 to 100 phr, still more preferably 80 to 100 phr, particularly 90 to 100 phr, more particularly 100 phr, of a first diene elastomer selected from the group consisting of natural rubber (NR), synthetic polyisoprenes (IR) and the mixtures thereof, preferably selected from the group consisting of natural rubber, synthetic polyisoprenes having a content (mol %) of cis-1,4-bonds of greater than 90%, more preferably of greater than or equal to 98% and the mixtures thereof, still more preferably natural rubber, and comprises no second diene elastomer, or comprises less than 50 phr preferably at most 40 phr, more preferably at most 30 phr, still more preferably at most 20 phr, particularly at most 10 phr, of a second diene elastomer which is different from the first diene elastomer, that is, the elastomer matrix comprises 0 to less than 50 phr, preferably 0 to 40 phr, more preferably 0 to 30 phr, still more preferably 0 to 20 phr, particularly 0 to 10 phr, of the second diene elastomer.

Each of the rubber compositions (FC, SC and TC) of the tread of the tire according to the invention is based on each reinforcing filler.

The reinforcing filler can reinforce the rubber composition.

The reinforcing filler may comprise a reinforcing organic filler (for example, carbon black), a reinforcing inorganic filler (for instance, silica) or the mixtures thereof.

Use may be made of any type of reinforcing filler known for its capabilities of reinforcing a rubber composition which can be used for the manufacture of tires, for example a reinforcing organic filler, such as carbon black, or a reinforcing inorganic filler, such as silica, with which a coupling agent is combined in a known way.

As carbon blacks, all carbon blacks conventionally used in tires ("tire-grade" blacks) are suitable, such as for example reinforcing carbon blacks of the 100, 200 or 300 series in ASTM grades (such as for example, the N115, N134, N234, N326, N330, N339, N347 or N375 blacks), or carbon blacks higher series, the 500, 600, 700 or 800 series in ASTM grades (such as for example the N550, N660, N683, N772, N774 blacks). The carbon blacks might for example be already incorporated in an elastomer matrix, for instance, a diene elastomer, in the form of a masterbatch (see for example applications WO 97/36724 or WO 99/16600).

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

The reinforcing inorganic filler may be silica. The silica may be a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$, more preferably 50 to 350 $m^2/g$, still more preferably 100 to 300 $m^2/g$, particularly between 150 and 250 $m^2/g$, wherein the BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multi-point volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B). Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

According to a preferred embodiment of the invention, in the first rubber composition (FC), the reinforcing filler comprises between 50 and 200 phr, preferably between 60 and 190 phr, more preferably between 70 and 180 phr, still more preferably between 80 and 170 phr, particularly between 90 and 160 phr, more particularly between 100 and 150 phr, still more particularly between 110 and 140 phr, advantageously between 120 and 130 phr, of a reinforcing inorganic filler (for example, silica).

According to a preferred embodiment of the invention, in the second rubber composition (SC), the reinforcing filler comprises between 20 and 200 phr, preferably between 30 and 190 phr, more preferably between 40 and 180 phr, still more preferably between 50 and 170 phr, particularly between 60 and 160 phr, more particularly between 70 and 150 phr, still more particularly between 80 and 140 phr, advantageously between 90 and 130 phr, advantageously between 100 and 120 phr, of a reinforcing inorganic filler (for example, silica).

According to a preferred embodiment of the invention, in the third rubber composition (TC), the reinforcing filler comprises between 10 and 200 phr, preferably between 20 and 190 phr, more preferably between 30 and 180 phr, still more preferably between 40 and 170 phr, particularly between 50 and 160 phr, more particularly between 50 and 150 phr, still more particularly between 50 and 140 phr, advantageously between 50 and 130 phr, advantageously between 50 and 120 phr, of a reinforcing inorganic filler (for example, silica).

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

$$Z\text{-}A\text{-}S_x\text{-}A\text{-}Z, \text{ in which:} \tag{I}$$

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

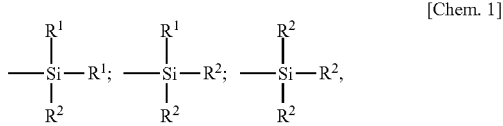
[Chem. 1]

in which:
- the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
- the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2HSO)_3 Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to a preferred embodiment of the invention, the content of coupling agent may be from 0.5 to 15% by weight per 100% by weight of the reinforcing inorganic filler, preferably silica if each rubber composition is based on the reinforcing inorganic filler, preferably silica.

According to a preferred embodiment of the invention, the amount of coupling agent is less than 30 phr (for example, between 0.1 and 30 phr), preferably less than 25 phr (for example, between 0.5 and 25 phr), more preferably less than 20 phr (for example, between 1 and 20 phr), still more preferably less than 15 phr (for example, between 1.5 and 15 phr) if each rubber composition is based on the reinforcing inorganic filler, preferably silica.

Each of the rubber compositions (FC, SC and TC) of the tread of the tire according to the invention is based on each crosslinking (or vulcanization) system based on sulphur, the amount in phr of sulphur in the first rubber composition (FC) is lower than that in the second rubber composition (SC), and the amount in phr of sulphur in the second rubber composition (SC) is higher than that in the third rubber composition (TC).

The crosslinking system may be further based on per oxide, bismaleimides, vulcanization accelerators, vulcanization activators or the mixtures thereof. The vulcanization activators may be based on zinc (pure zinc and/or zinc derivatives (for example, zinc fatty acid salt)), fatty acid (in particular, stearic acid), guanidine derivatives (in particular diphenylguanidine) and/or the like.

The rubber compositions (FC, SC and TC) of the treads of the tires in according to the invention may be based on all or a portion(s) of the usual additives generally used in the elastomer compositions intended for the manufacture of treads for tires, in particular for snow tires or winter tires, such as, for example, protection agents, such as antiozone waxes, chemical antiozonants, antioxidants, plasticizing agent, tackifying resins, methylene acceptors (for example, phenolic novolak resin) or methylene donors (for example, hexamethylenetetramine (HMT) or hexamethoxymethylmelamine (H3M)).

These compositions can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

According to a preferred embodiment of the invention, first rubber composition (FC), the second rubber composition (SC), and/or (advantageously and) the third rubber composition (TC) is/are based on a plasticizing agent in order to soften the matrix by diluting the elastomer and the reinforcing filler.

According to a more preferred embodiment of the above preferred embodiment, in the first rubber composition (FC) and/or (advantageously and) the second rubber composition (SC), the amount of the plasticizing agent is more than 30 phr, preferably more than 40 phr, more preferably more than 50 phr, still more preferably more than 60 phr.

According to a more preferred embodiment of the above preferred embodiment, in the third rubber composition (TC), the amount of the plasticizing agent is more than 5 phr, preferably more than 10 phr, more preferably more than 15 phr, still more preferably more than 20 phr.

The plasticizing agent may comprise a liquid plasticizer(s), a hydrocarbon resin(s) or the mixtures thereof.

Any extending oil, whether of aromatic or non-aromatic nature, any liquid plasticizing agent known for its plasticizing properties with regard to elastomer matrix(es) (for instance, diene elastomer), can be used as the liquid plasticizer. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

According to a more preferred embodiment of the above preferred embodiment, in the first rubber composition (FC) and/or (advantageously and) the second rubber composition (SC), the plasticizing agent comprises no liquid plasticizer or comprises at most 100 phr, preferably at most 90 phr, more preferably at most 80 phr, still more preferably at most 70 phr, particularly at most 60 phr, more particularly 10 to 60 phr, of a liquid plasticizer(s).

According to a more preferred embodiment of the above preferred embodiment, in the first rubber composition (FC) and/or (advantageously and) the second rubber composition (SC), the plasticizing agent comprises a liquid plasticizer(s) selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof, preferably selected from the group consisting of MES oils, TDAE oils, naphthenic oils, vegetable oils and the mixtures thereof, more preferably selected from the group consisting of MES oils, vegetable oils and the mixtures thereof, still more preferably selected from the group consisting of vegetable oils and the mixtures thereof. The vegetable oil(s) may be made of an oil selected from the group consisting of linseed, safflower, soybean, corn, cottonseed, turnip seed, castor, tung, pine, sunflower, palm, olive, coconut, groundnut and grapeseed oils, and the mixtures thereof, particularly sunflower oil(s), more particularly sunflower oil(s) containing over 60%, still more particularly over 70%, especially over 80%, more especially over 90%, still more especially 100%, by weight of oleic acid.

While, in a manner known to a person skilled in the art, the designation "resin" is reserved in the present application, by definition, for a compound which is solid at ambient temperature (20° C. under atmosphere pressure), in contrast to a liquid plasticizing compound, such as an oil.

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

According to a more preferred embodiment of the above preferred embodiment, in the first rubber composition (FC) and/or (advantageously and) the second rubber composition (SC), the plasticizing agent comprises no hydrocarbon resin or comprises at most 100 phr, preferably at most 90 phr, more preferably at most 80 phr, still more preferably at most 70 phr, particularly at most 60 phr, more particularly 10 to 60 phr, of a hydrocarbon resin(s).

Preferably, the hydrocarbon resin(s) as being "plasticizing" exhibits at least one, more preferably all, of the following characteristics:
  a $Tg_{DSC}$ of above 20° C. (for example, between 20° C. and 100° C.), preferably above 30° C. (for example, between 30° C. and 100° C.), more preferably above 40° C. (for example, between 40° C. and 100° C.);
  a number-average molecular weight (Mn) of between 400 and 2000 g/mol (more preferably between 500 and 1500 g/mol);
  a polydispersity index (PI) of less than 3, more preferably less than 2 (reminder: PI=Mw/Mn with Mw the weight-average molecular weight).

The macrostructure (Mw, Mn and PI) of the hydrocarbon resin(s) is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a more preferred embodiment of the above preferred embodiment, in the first rubber composition (FC) and/or (advantageously and) the second rubber composition (SC), the plasticizing agent comprises a hydrocarbon resin(s) selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alphamethyl styrene homopolymer or copolymer resins and the mixtures thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinyl-aromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinyl-aromatic monomer. Preferably, the vinylaromatic compound is styrene or a vinyl-aromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:
- polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);
- $C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";
- limonene/styrene copolymer resins: by DRT under the name "Dercolyte TS 105" or by Arizona Chemical Company under the names "ZT115LT" and "ZT5100".

Mention may also be made, as examples of other preferred resins, of phenolmodifieda-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

Each of the rubber compositions (FC, SC and TC) of the treads of the tires according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which sulphur in the crosslinking system (and also a vulcanization accelerator if the crosslinking system is further based on the vulcanization) is/are incorporated.

A process which can be used for the manufacture of each of such compositions comprises (FC, SC and TC), for example and preferably, the following steps:
- incorporating in the elastomer matrix(es), for instance, the diene elastomer(s), in a mixer, the reinforcing filler, during a first stage ("non productive" stage) everything being kneaded thermomechanically (for example in one or more steps) until a maximum temperature of between 110° C. and 190° C. is reached;
- cooling the combined mixture to a temperature of less than 100° C.;
- subsequently incorporating, during a second stage (referred to as a "productive" stage), sulphur in the crosslinking system (and also a vulcanization accelerator if the crosslinking system is further based on the vulcanization);
- kneading everything up to a maximum temperature of less than 110° C.;
- extruding or calendering the rubber composition thus obtained, in particular in the form of a tire tread.

By way of example, the first (non-productive) phase is carried out in a single thermomechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of sulphur in the crosslinking system (and also a vulcanization accelerator if the crosslinking system is further based on the vulcanization accelerator). The total kneading time, in this non-productive phase, is preferably between 1 and 15 min.

After cooling the mixture thus obtained, sulphur in the crosslinking system (and also a vulcanization accelerator if the crosslinking system is further based on the vulcanization accelerator) is/are then incorporated at low temperature (for example, between 40° C. and 100° C.), generally in an external mixer, such as an open mill; the combined mixture is then mixed (the second (productive) phase) for a few minutes, for example between 2 and 15 min.

The final composition thus obtained is subsequently calendered, for example in the form of a sheet or of a plaque, in particular for laboratory characterization, or else extruded in the form of a rubber profiled element which can be used directly as each portion of snow tire tread or winter tire tread.

As for making the tire according to the invention, it is possible to build a first layer of a homogeneous rubber composition, as the first rubber composition (FC), a second layer of a homogeneous rubber composition, as the second rubber composition (SC), and a third layer of a homogeneous rubber composition, as the third rubber composition (TC), then to superpose the second layer onto the third layer and next to superpose the first layer onto the second layer, or sandwich the other layer(s) or portion(s) between these layers (between the first layer and the second layer or between the second layer and the third layer), to get a raw tread band, and then build and mold a tire. The first layer forming the external portion is radially outer located to the intermediate portion. Preferably, the first layer is located to be intended to come into contact with the ground in the new state of the tire. The second layer forming the intermediate portion is radially inner located to the external portion and is radially outer located to the internal portion. Preferably, the second layer is adjacent to the external portion. The third layer forming the internal portion is radially inner located to the intermediate portion. Preferably, the third layer is adjacent to the intermediate portion.

The vulcanization (or curing) is carried out in a known way at a temperature generally of between 110° C. and 190° C. for a sufficient time which can vary, for example, between 5 and 90 min depending in particular on the curing temperature, the vulcanization system adopted and the vulcanization kinetics of the composition under consideration.

The invention relates to the rubber compositions, to the treads and the tires described above, both in the raw state (i.e., before curing) and in the cured state (i.e., after crosslinking or vulcanization).

The invention is further illustrated by the following non-limiting examples.

EXAMPLE

In the test, three rubber compositions (C-1, C-2 and C-3) were used. The three rubber compositions are based on a diene elastomer (SBR/BR or NR) reinforced with a blend of silica (as a reinforcing inorganic filler) and carbon black, and a crosslinking system based on sulphur. The formulations of the three rubber compositions are given at Table 1 with the content of the various products expressed in phr.

Each rubber composition was produced as follows: The reinforcing filler, the elastomer matrix and the various other ingredients, with the exception of sulphur and a sulphenamide type vulcanization accelerator (as a vulcanization accelerator) in the crosslinking system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and the sulphenamide type vulcanization accelerator were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

In order to confirm the effect of the invention, two tires (T-1: a reference, and T-2: an example according to the invention) having treads comprising the radially external portion, the radially intermediate portion and the radially internal portion produced by superposition of the sheets of the rubber compositions (C-1, C-2 and C-3), as shown in Table 2, are compared.

These tires, as snow tire having treads comprising grooves circumferentially and/or axially extending, were conventionally manufactured and in all respects identical apart from the rubber compositions of treads. These tires are radial carcass passenger vehicle tires and the size of them is 205/55R16.

As snow braking test, a 1,400 cc passenger car provided on all of the four wheels with the same kind of these tires (in the new state) under 220 kPa of tire inflation pressure mounted onto 6.5J×16 rim was run on a snow covered road at a temperature of −10° C., the deceleration from 50 to 5 km/h during sudden longitudinal braking while anti-lock braking system (ABS) activated was measured. The above snow tests were conducted on a hard pack snow with a CTI penetrometer reading of about 90 in accordance with Standard ASTM F1805.

Furthermore, all of the tires were fitted to the front and rear axles of motor vehicles, under nominal tire inflation pressure, and were subjected to rolling on a circuit in order to reproduce the tires in the worn state. Then, the above snow braking test was done with the worn tires. Each of the worn tires was still in the service life, and in each of them, each radially internal portion made of each third rubber composition at least partially appeared on each tread surface and could at least partially contact with the ground.

The results of the braking tests on snow road are reported in Table 2, in relative units, the base 100 being selected for the reference tire T-1 (it should be remembered that a value of greater than 100 indicates an improved performance).

The results from Table 2 demonstrate that the test tire T-2 according to the invention has certainly higher values of the grip performance on snow than that of the reference T-1 in the worn state, and while improving the grip performance in the new state.

In conclusion, the treads of the tires in accordance with the invention allow an improvement braking performance on snow in the worn state while improving or maintaining the grip performance in the new state.

TABLE 1

| Rubber composition(s) | C-1 | C-2 | C-3 |
|---|---|---|---|
| BR (1) | 25 | | |
| SBR (2) | 75 | | |
| NR (3) | | 100 | 100 |
| Carbon black 1 (4) | 4 | | |
| Carbon black 2 (5) | | 4 | 5 |
| Silica 1 (6) | 120 | 115 | |
| Silica 2 (7) | | | 60 |
| Coupling agent (8) | 9.6 | 9.2 | 12 |
| Liquid plasticizer 1 (9) | 25 | 30 | |
| Liquid plasticizer 2 (10) | | | 30 |
| Hydrocarbon resin (11) | 55 | 40 | |
| Antioxidant (12) | 2.8 | | |
| Antiozone wax | 1.9 | | 1.5 |
| DPG (13) | 2.1 | 2.1 | 1.8 |
| Stearic acid | 3.0 | 5.0 | 2.0 |
| Zinc oxide | 1.5 | 1.4 | 3.0 |
| Sulphur | 1.4 | 2.8 | 2.0 |
| CBS (14) | 1.6 | 3.2 | 1.7 |

(1) BR: BR with 0.3% of 1,2 vinyl; 2.7% of trans; 97% of cis-1,4 (Tg$_{DSC}$ = −105° C.);
(2) SBR: Solution SBR with 16% of styrene unit (Tg$_{DSC}$ = −65° C.);
(3) NR: Natural rubber (peptised);
(4) Carbon black 1: Carbon black (ASTM grade N234 from Cabot, BET (in accordance with ASTM D6556-10): 116 m$^2$/g, COAN: 101 ml/100 g);
(5) Carbon black 2: Carbon black (ASTM grade N774 from Cabot, BET (in accordance with ASTM D6556-10): 32 m$^2$/g, COAN: 65 ml/100 g);
(6) Silica 1: Silica ("Zeosil 1165MP" from Rhodia (CTAB: 160 m$^2$/g, BET (in accordance with the French standard NF ISO 9277 of December 1996): about 160 m$^2$/g));
(7) Silica 2: Silica ("Zeosil Premium 200MP" from Rhodia (CTAB: 200 m$^2$/g, BET (in accordance with the French standard NF ISO 9277 of December 1996): 215 m$^2$/g));
(8) Coupling agent TESPT ("Si69" from Evonik);
(9) Oleic sunflower oil ("Agripure 80" from Cargill, Weight percent oleic acid: 100%);
(10) Tris(2-ethylhexyl)phosphate ("Disflamoll TOF" from Lanxess, Tg$_{DSC}$ = −105° C.);
(11) Hydrocarbon resin C$_5$/C$_9$ type ("Escorez ECR-373" from Exxon, Tg$_{DSC}$ = 44° C.).
(12) Mixture of N-(1,3-dimethylbutyl)-N-phenyl-para-phenylenediamine ("Santoflex 6-PPD" from Flexsys);
(13) Diphenylguanidine ("Perkacit DPG" from Flexsys);
(14) N-dicyclohexyl-2-benzothiazolesulphenamide ("Santocure CBS" from Flexsys).

TABLE 2

| | T-1 | T-2 |
|---|---|---|
| First rubber composition (FC) | C-1 | C-1 |
| Second rubber composition (SC) | C-1 | C-2 |
| Third rubber composition (TC) | C-1 | C-3 |
| Snow braking in the new state | 100 | 111 |
| Snow braking in the worn state | 100 | 116 |

The invention claimed is:

1. A snow tire having a tread comprising at least three radially superposed portions which comprise a radially external portion being made of a first rubber composition, a radially intermediate portion being made of a second rubber composition, and a radially internal portion being made of a third rubber composition,
  wherein each of the rubber compositions is based on at least:
    an elastomer matrix;
    a reinforcing filler; and
    a crosslinking system based on sulfur,
  wherein an amount in phr of sulfur in the first rubber composition is lower than an amount in phr of sulfur in the second rubber composition, wherein the amount in phr of sulfur in the second rubber composition is higher than an amount in phr of sulfur in the third rubber composition, wherein the elastomer matrix comprises at least a diene elastomer selected from the group consisting of polybutadienes, natural rubber, synthetic polyisoprenes, butadiene copolymers, isoprene copolymers, and mixtures thereof, and wherein in the second rubber composition and in the third rubber composition, the elastomer matrix comprises more than 50 phr and up to 100 phr of a first diene elastomer selected from the group consisting of natural rubber (NR), synthetic polyisoprenes (IR) and the mixtures thereof.

2. The snow tire according to claim 1, wherein the amount of sulfur in the second rubber composition is more than 2 phr.

3. The snow tire according to claim 1, wherein the crosslinking system is further based on a vulcanization accelerator.

4. The snow tire according to claim 3, wherein an amount in phr of the vulcanization accelerator in the first rubber composition is lower than an amount in phr of the vulcanization accelerator in the second rubber composition, and wherein the amount in phr of the vulcanization accelerator in the second rubber composition is higher than an amount in phr of the vulcanization accelerator in the third rubber composition.

5. The snow tire according to claim 4, wherein the amount of the vulcanization accelerator in the second rubber composition is more than 2 phr.

6. The snow tire according to claim 3, wherein a total amount in phr of sulfur and vulcanization accelerator in the first rubber composition is lower than a total amount in phr of sulfur and vulcanization accelerator in the second rubber composition, and wherein the total amount in phr of sulfur and vulcanization accelerator in the second rubber composition is higher than a total amount in phr of sulfur and vulcanization accelerator in the third rubber composition.

7. The snow tire according to claim 6, wherein the total amount of sulfur and vulcanization accelerator in the second rubber composition is more than 4 phr.

8. The snow tire according to claim 3, wherein the vulcanization accelerator is selected from the group consisting of sulfenamide type vulcanization accelerators, thiuram type accelerators, zinc dithiocarbamate type vulcanization accelerators and mixtures thereof.

9. The snow tire according to claim 8, wherein the vulcanization accelerator predominantly comprises a sulfenamide type vulcanization accelerator.

10. The snow tire according to claim 1, wherein an amount of reinforcing filler in the first rubber composition is 60 to 200 phr, wherein an amount of reinforcing filler in the second rubber composition is 30 to 200 phr, and wherein an amount of reinforcing filler in the third rubber composition is 20 to 200 phr.

11. The snow tire according to claim 1, wherein the reinforcing filler in each of the rubber compositions predominantly comprises a reinforcing inorganic filler.

12. The snow tire according to claim 11, wherein the reinforcing inorganic filler predominantly comprises silica.

13. The snow tire according to claim 1, wherein the reinforcing filler in each of the rubber compositions comprises less than 75 phr of carbon black.

14. The snow tire according to claim 1, wherein the third rubber composition is further based on a plasticizing agent comprising a liquid plasticizer exhibiting a glass transition temperature of less than −70° C.

15. The snow tire according to claim 14, wherein an amount of the liquid plasticizer is 5 to 100 phr.

16. The snow tire according to claim 14, wherein the liquid plasticizer is selected from the group consisting of liquid phosphate plasticizers and mixtures thereof.

17. The snow tire according to claim 16, wherein the liquid phosphate plasticizer has between 12 and 30 carbon atoms in total.

18. The snow tire according to claim 1, wherein the radially external portion made of the first rubber composition is adjacent to the radially intermediate portion made of the second rubber composition, and wherein the radially intermediate portion made of the second rubber composition is adjacent to the radially internal portion made of the third rubber composition.

19. The snow tire according to claim 1, wherein the radially external portion, the radially intermediate portion and the radially internal portion are intended to come into contact with the ground during a service life of the tire.

20. A snow tire having a tread comprising at least three radially superposed portions which comprise a radially external portion being made of a first rubber composition, a radially intermediate portion being made of a second rubber composition, and a radially internal portion being made of a third rubber composition, wherein each of the rubber compositions is based on at least:
an elastomer matrix;
a reinforcing filler; and
a crosslinking system based on sulfur, wherein an amount in phr of sulfur in the first rubber composition is lower than an amount in phr of sulfur in the second rubber composition, wherein the amount in phr of sulfur in the second rubber composition is higher than an amount in phr of sulfur in the third rubber composition, and wherein the reinforcing filler in each of the rubber compositions comprises more than 50% by weight of a reinforcing inorganic filler.

* * * * *